Feb. 7, 1956      I. C. MACDOUGALL      2,733,984
MANUFACTURE OF CARBON BISULFIDE
Filed Dec. 4, 1952
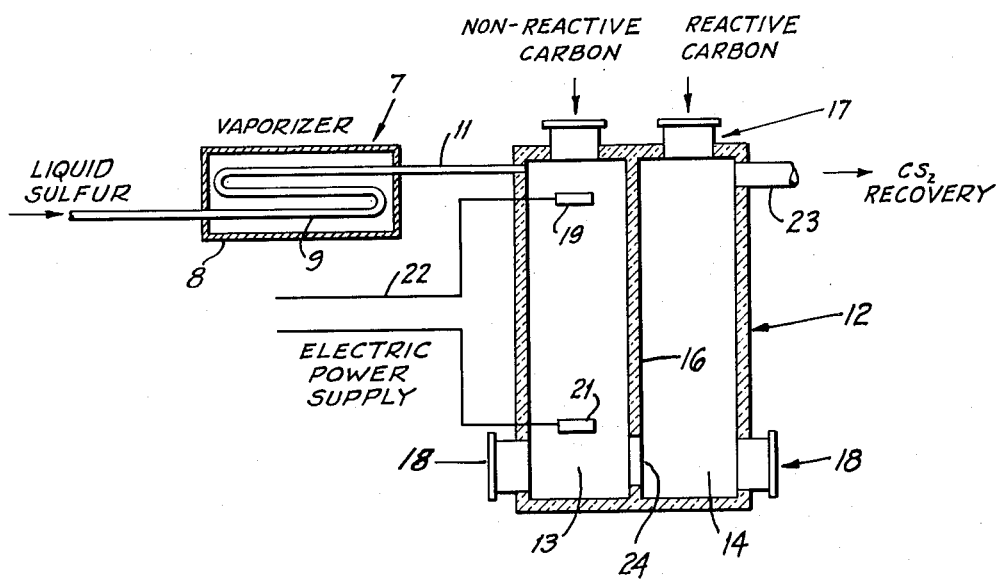
INVENTOR.
IVER C. MACDOUGALL
ECKHOFF & SLICK
ATTORNEYS
BY
A MEMBER OF THE FIRM United States Patent Office 2,733,984
Patented Feb. 7, 1956

2,733,984

MANUFACTURE OF CARBON BISULFIDE

Iver C. Macdougall, Old Hickory, Tenn., assignor to Stauffer Chemical Company, a corporation of California Application December 4, 1952, Serial No. 324,066

2 Claims. (Cl. 23—206)

This invention relates to the manufacture of carbon bisulphide.

Carbon bisulphide is produced by the reaction of carbon and superheated sulphur vapor. The source of carbon may be a hydrocarbon, such as methane, or a solid carbon, such as wood-charcoal, coal, coal-coke or petroleum coke. In all cases the sulphur vapor must be highly superheated and in the case of hydrocarbons it must be heated under superatmospheric pressure.

The degree of superheat required for reaction depends on the type of carbon used, being lowest in the case of hydrocarbons and, among the solid carbons, being lowest in the case of wood-charcoal. Even when a hydrocarbon or wood-charcoal is used, the temperature of sulphur vapor required to promote reaction at a practical rate, causes rapid corrosion of any commonly used metal present in the superheater and poses serious problems from the standpoint of construction materials, heat transfer and fuel economy. In the case of all solid carbons other than wood-charcoal still higher temperatures are required, and the difficulties in constructing and operating the superheater are of such magnitude as to make these abundant and cheap carbons unavailable for commercial production of carbon bisulphide.

Regardless of the type of carbon used in the formation of carbon bisulphide, the rate of reaction increases as the temperature of the sulphur vapor is increased. Hence, the size of the reaction vessel required for a given rate of production may be reduced, or, alternatively, the output of a given reactor may be increased, by increasing the temperature of the sulphur vapor. Since plants invariably consist of a number of reactor units, the size of a plant for a given rate of production can be minimized by using sulphur vapor at the highest practical temperature, thereby effecting very substantial savings in initial investment.

From the above, it will be apparent that an apparatus which will produce sulphur vapor over a wide range of elevated temperatures, at any temperature specifically desired, and which is resistant to both corrosion and pressure and is economical in the use of fuel, will constitute a definite advance in the art and practice of manufacturing carbon bisulphide. Heretofore, several devices and processes have been proposed for this operation, but none has proven completely satisfactory.

It has also been proposed heretofore to accomplish heating of the reactants, carbon and sulphur, by passing an electric current through the carbon to be reacted and by injecting liquid sulphur into the so-heated hot carbon mass. Under these conditions, the liquid sulphur is vaporized and both the carbon and the sulphur vapor are raised to reaction temperature. The reaction proceeds satisfactorily during the start-up of the apparatus and for a short time thereafter. However, as ash from the carbon undergoing reaction is deposited in the reactor and as the character of the resistance bed changes both chemically and physically, the flow of electrical energy must be continuously varied and progressively increased to maintain uniform heating conditions in the apparatus. This necessitates complicated electrical controls, and frequent cleaning of the reactor. Cleaning, establishment of a new bed and reheating, represent losses of labor, time, carbon and heat. In the above-described operation, all the heat required to raise liquid sulphur to its boiling point, to vaporize the sulphur and, finally, to superheat the sulphur vapor to reaction temperature is supplied electrically.

In accordance with the present invention, I have found that sulphur can be superheated electrically quite satisfactorily in simple equipment under conditions which are suited to its superheating, the sulphur being heated to a temperature whereat it will react with a hydrocarbon or wood-charcoal to form carbon bisulfide or, if preferred, the temperature of the sulphur can be increased to one whereat it will react with other sources of carbon such as petroleum coke and other forms of carbon which are not considered economically feasible today as suitable for use in this reaction.

It is in general the broad object of the present invention to provide a novel and improved process for the manufacture of carbon bisulfide.

A further object of the present invention is to provide a process for the manufacture of carbon bisulfide wherein sulfur is vaporized in a first zone, then heated electrically in a second zone to a temperature whereat it will react with a desired carbon and is then transferred to a third zone wherein it reacts with carbon.

In accordance with this invention a low-cost fuel is used to vaporize the sulphur and to superheat the sulphur vapor to such a temperature that it will not corrode the apparatus at a serious rate. It is only in the range where corrosion is serious that electricity is used to superheat the sulphur vapor.

To illustrate the above, let us assume that a solid carbon, the optimum reaction temperature for which is 1000° C., is to be reacted at atmospheric pressure. In this case, vaporization and preliminary superheating to 700° C. can be effected in cast iron equipment fired with a cheap fuel, e. g. fuel oil or a gas fuel. The enthalpy of sulphur at 1000° C. is 1140 B. t. u.'s/lb., at 700° C. it is 980 B. t. u.'s/lb. and at the melting point is 65 B. t. u.'s/lb. Hence, of the total heat required to raise sulphur from the melting point to an end temperature of 1000° C., approximately 85% would be supplied by cheap fuel up to 700° C. and approximately 15% would be supplied electrically between 700° C. and 1000° C.

In further illustration, let us assume that methane and sulphur are to be reacted at four atmospheres pressure and at a temperature of 600° C. At this pressure, cast iron cannot be satisfactorily used and resort must be had to expensive steel alloys to withstand corrosion. Even at 600° C., frequent replacement of those elements of the superheater in contact with the sulphur is necessary. In this case, the sulphur should be vaporized in a primary heater using a cheap fuel and the vapor should be fed at the boiling point to the electrical superheater. Under these conditions, approximately 12% of the total heat would be supplied electrically.

The invention includes other objects and features of advantage, some of which together with the foregoing, will appear hereinafter wherein the present preferred form of process for the manufacture of carbon bisulfide is disclosed.

In the drawing accompanying and forming a part hereof, the single figure is a diagrammatic showing of suitable apparatus and a flow sheet which can be utilized to practice this invention.

Referring to the drawing, I have shown the apparatus more or less diagrammatically because the several pieces of equipment utilized can take various forms. Thus, I have indicated a sulphur vaporizer at 7 as including a suitable furnace structure 8 having a coil 9 therein and heated by burning coal, oil, gas or other fuel. Liquid sulfur is fed to coil 9, issuing from the furnace through line 11 as a vapor. A sulfur superheater and reaction chamber is generally indicated at 12 and includes a sulphur superheating chamber 13, and a reaction chamber 14 separated by a common vertical dividing wall 16; if desired, the chambers 13 and 14 can be physically separate and I have merely indicated the two in association with one common wall so that the slight exothermic heat from the reaction can be utilized to heat the sulfur vapor and the heat from the sulphur vapor superheating chamber can be utilized to supply heat to the carbon undergoing reaction, if desired.

The chambers 13 and 14 can be constructed principally of ceramic materials since their walls do not have to act as heat transfer means, a substantial simplification. The retorts presently used as reaction vessels for producing carbon bisulfide are large expensive castings having a life span which is usually measured in days, because it is comparatively short. The size of the individual retorts is determined by the weight which can be practically handled, usually a matter of several tons. Since the vessels required for the practice of this invention can be built in place and of usual materials of construction, e. g., refractory lined steel shells, the limitation on size and weight is eliminated and the reactor can be built as large as is desired and utilizing a construction which is much less expensive than casting. Further, the vessels can be built to withstand pressure and superheated sulphur vapor and a reactant hydrocarbon can be supplied under a superatmospheric pressure.

Each chamber includes an inlet 17 and a draw-off 18 so that the chamber can be emptied for examination, repair or the like; in the case of the reaction chamber, the ash is withdrawn periodically. In the electrical superheating chamber 13 suitable electrodes 19 and 21 are provided and are supplied with suitable electric power through lines 22. A carbon bisulfide vapor outlet 23 is provided from the reaction chamber 14.

In operation, the electrical superheating chamber is filled with pieces of a material which is relatively non-reactive with sulphur at a temperature at which sulphur issues from the superheater chamber such as graphite, electrode carbon or a suitable non-carbonaceous material such as carborundum. Since the resistance material provided between electrodes 19 and 21 in the superheating chamber 13 does not react with the sulphur, the resistance of the porous bed remains substantially constant and does not change as the sulphur vapor flows through the bed, thus simplifying the electrical supply and control. Further, since the electrical resistance material in the electrical superheating chamber 13 does not react with the sulphur, ash does not form and the velocity of sulphur through the bed and the heating characteristics of the bed remain substantially constant.

By the time the sulphur vapor has reached the desired elevated temperature, e. g., 550° C. and above as desired, it passes through opening 24 in the wall 16 and into contact with the reactive form of carbon therein, forming carbon bisulfide. Any ash is drawn off periodically through draw-off 18, but without interfering with the operation of the electrical superheater or the bed of resistance material provided between the electrodes 19 and 21.

In place of using a static bed of carbon, the stream of sulphur vapor can be passed into a fluidized bed, for example, to react with carbon under fluidized reaction conditions such as those set forth in the Belchetz Patent No. 2,487,039; it can be reacted with a hydrocarbon in the presence of a catalyst such as a metal sulfide, as is taught in the De Simo Patent No. 2,187,393, or with a non-metallic catalyst, as in the Thacker Patent No. 2,330,934.

To illustrate the practice of the invention, 350 pounds per hour of liquid sulphur were fed as a liquid into the vaporizer 7. The sulphur issued from the vaporizer at a temperature of 600° C. through line 11 into the electrical superheater chamber 13 wherein the sulphur was superheated to a temperature of 1000° C. Chamber 14 had previously been filled with a previously coked coal. This reacted readily with the sulphur vapor at 1000° C. and a stream of carbon bisulfide, corresponding substantially stoichiometrically to the quantity of sulfur fed, issued through the sulfur-carbon bisulfide outlet 13.

From the foregoing, I believe it will be apparent that I have provided a new and novel process for the manufacture of carbon bisulfide, one enabling the cheaper and more readily available forms of carbon to be utilized as a carbon source in the manufacture of this material. The invention is not limited, however, to utilization with those forms of carbon which are not as reactive as wood-charcoal since it can be used to advantage with the latter material, the reaction rate being increased because of the higher sulphur temperature to provide an increased production per unit volume of apparatus. By confining the use of electrical energy to only the superheating of sulphur and by vaporizing the sulphur with a less expensive source of heat such as oil or gas, a material economy in heat cost is secured.

I claim:

1. A process for manufacture of carbon bisulfide comprising vaporizing liquid sulfur in a first zone; superheating the vaporized sulfur to a temperature of at least 550° C. in a second zone by passing electricity through a porous resistance mass in said second zone which is substantially non-reactive with sulfur while continuously passing the vaporized sulfur vapor in contact with said porous resistance mass to raise the temperature of the sulfur vapor to at least 550° C.; and subsequently and continuously passing the superheated sulfur into contact with a mass of reactive carbon in a third zone to form carbon bisulfide without the addition of extraneous heat.

2. A process for manufacture of carbon bisulfide comprising vaporizing sulfur in a first zone, passing the vaporized sulfur into a second zone and into contact in said second zone with a mass of material which is substantially non-reactive to sulfur and which is heated simultaneously by passage of electricity therethrough to a temperature of at least 550° C. whereby the sulfur vapor passing in contact with the mass is superheated to a temperature of at least 550° C., withdrawing said superheated sulfur vapor continuously from contact with said mass in said second zone, and subsequently and continuously passing said superheated sulfur into a third zone and into contact with a reactive carbonaceous material in said third zone to react with said carbon therein and form carbon bisulfide without the addition of extraneous heat.

References Cited in the file of this patent

UNITED STATES PATENTS

| | | |
|---|---|---|
| 805,502 | Taylor | Nov. 28, 1905 |
| 1,312,800 | Moore et al. | Aug. 12, 1919 |
| 1,549,812 | Siedler | Aug. 18, 1925 |
| 1,857,799 | Winkler | May 10, 1932 |
| 2,141,758 | Merriam | Dec. 27, 1938 |
| 2,684,393 | Halm et al. | June 20, 1954 |